(12) United States Patent
Dourfaye et al.

(10) Patent No.: US 8,662,209 B2
(45) Date of Patent: Mar. 4, 2014

(54) BACKFILLED POLYCRYSTALLINE DIAMOND CUTTER WITH HIGH THERMAL CONDUCTIVITY

(75) Inventors: Alfazazi Dourfaye, Paris (FR); William W. King, Houston, TX (US); Michael R. Reese, Houston, TX (US)

(73) Assignee: Varel International, Ind., L.P., Carrollton, TX (US)

( * ) Notice: Subject to any disclaimer, the term of this patent is extended or adjusted under 35 U.S.C. 154(b) by 195 days.

(21) Appl. No.: 12/716,208

(22) Filed: Mar. 2, 2010

(65) Prior Publication Data
US 2010/0243336 A1    Sep. 30, 2010

Related U.S. Application Data

(60) Provisional application No. 61/164,155, filed on Mar. 27, 2009.

(51) Int. Cl.
*E21B 10/36* (2006.01)

(52) U.S. Cl.
USPC ........ 175/433; 175/434; 175/420.2; 175/425; 175/426

(58) Field of Classification Search
USPC ........... 175/405.1, 420.2, 434, 433, 425, 426; 51/295
See application file for complete search history.

(56) References Cited

U.S. PATENT DOCUMENTS

| | | |
|---|---|---|
| 4,016,736 A | 4/1977 | Carrison et al. |
| 4,124,401 A | 11/1978 | Lee et al. |
| 4,184,079 A | 1/1980 | Hudson et al. |
| 4,536,442 A | 8/1985 | Bovenkerk et al. |
| 4,605,343 A | 8/1986 | Hibbs, Jr. et al. |
| 4,664,705 A | 5/1987 | Horton et al. |
| 4,670,024 A * | 6/1987 | Bhat et al. ........ 51/295 |
| 4,940,180 A | 7/1990 | Martell |
| 4,995,887 A | 2/1991 | Barr et al. |
| 5,025,874 A | 6/1991 | Barr et al. |
| 5,078,551 A | 1/1992 | Oomen |
| 5,127,923 A | 7/1992 | Bunting et al. |
| 5,277,940 A | 1/1994 | Caballero |
| 5,379,854 A | 1/1995 | Dennis |
| 5,609,926 A | 3/1997 | Prins |

(Continued)

FOREIGN PATENT DOCUMENTS

| | | |
|---|---|---|
| CN | 1906266 A | 1/2007 |
| WO | WO-01/79583 A2 | 10/2001 |

OTHER PUBLICATIONS

International Search Report, International Application No. PCT/US2010/028807, dated May 25, 2010.

(Continued)

*Primary Examiner* — Yong-Suk (Philip) Ro
(74) *Attorney, Agent, or Firm* — Gardere Wynne Sewell LLP

(57) ABSTRACT

A front face of a diamond table mounted to a substrate is processed, for example through an acid leach, to remove interstitial catalyst binder and form a thermal channel. A material is then introduced to the front face of the diamond table, the introduced material backfilling the front face of the diamond table to fill interstitial voids left by removal of the catalyst binder in the thermal channel to a desired depth. The material is selected to be less thermally expandable than the catalyst binder and/or more thermally conductive than the catalyst binder and/or having a lower heat capacity than the catalyst binder.

27 Claims, 3 Drawing Sheets

(56) References Cited

U.S. PATENT DOCUMENTS

| | | | |
|---|---|---|---|
| 5,645,617 A | 7/1997 | Frushour | |
| 5,647,878 A | 7/1997 | Iacovangelo et al. | |
| 5,722,497 A * | 3/1998 | Gum et al. | 175/374 |
| 5,769,986 A | 6/1998 | Hagedorn et al. | |
| 5,857,889 A | 1/1999 | Abbott | |
| 6,068,913 A | 5/2000 | Cho et al. | |
| 6,258,139 B1 * | 7/2001 | Jensen | 51/307 |
| 6,443,248 B2 | 9/2002 | Yong et al. | |
| 6,663,682 B2 | 12/2003 | Baldoni et al. | |
| 6,779,951 B1 | 8/2004 | Vale et al. | |
| 6,887,144 B2 | 5/2005 | D'Evelyn et al. | |
| 7,008,672 B2 | 3/2006 | Gordeev et al. | |
| 7,350,601 B2 | 4/2008 | Belnap et al. | |
| 7,377,341 B2 | 5/2008 | Middlemiss et al. | |
| 7,635,035 B1 | 12/2009 | Bertagnolli et al. | |
| 2002/0014041 A1 | 2/2002 | Baldoni et al. | |
| 2005/0050801 A1 | 3/2005 | Cho et al. | |
| 2005/0137078 A1 | 6/2005 | Anderson et al. | |
| 2006/0060392 A1 | 3/2006 | Eyre | |
| 2006/0157285 A1 * | 7/2006 | Cannon et al. | 175/374 |
| 2007/0079994 A1 * | 4/2007 | Middlemiss | 175/426 |
| 2007/0187155 A1 | 8/2007 | Middlemiss | |
| 2007/0278017 A1 | 12/2007 | Shen et al. | |
| 2008/0073126 A1 | 3/2008 | Shen et al. | |
| 2008/0073127 A1 | 3/2008 | Zhan et al. | |
| 2008/0098659 A1 * | 5/2008 | Sung | 51/293 |
| 2008/0115421 A1 | 5/2008 | Sani | |
| 2008/0115424 A1 | 5/2008 | Can et al. | |
| 2008/0142276 A1 | 6/2008 | Griffo et al. | |
| 2008/0179104 A1 * | 7/2008 | Zhang et al. | 175/374 |
| 2008/0223623 A1 | 9/2008 | Keshavan et al. | |
| 2008/0230280 A1 | 9/2008 | Keshavan et al. | |
| 2008/0302579 A1 | 12/2008 | Keshavan et al. | |
| 2008/0308276 A1 | 12/2008 | Scott | |
| 2009/0090563 A1 | 4/2009 | Voronin et al. | |
| 2009/0218276 A1 | 9/2009 | Linford et al. | |
| 2010/0108403 A1 | 5/2010 | Keshavan | |

OTHER PUBLICATIONS

Written Opinion of the International Searching Authority, International Application No. PCT/US2010/028807, dated May 25, 2010.

Wang et al., "A Study on the Oxidation Resistance of Sintered Polycrystalline Diamond with Dopants", KTK Scientific Publishers / Terra Scientific Publishing Company, 1990, pp. 437-439.

Ortega et al., "Frictional Heating and Convective Cooling of Polycrystalline Diamond Drag Tools During Rock Cutting", Society of Pertoleum Engineers Journal, 0197-7520/84/0041-1061$00.25, Apr. 1984, pp. 121-128.

Thermal Technology LLC, High Temperature Experts, Newsflash "Spark Plasma Sintering, SPS Technology", Feb. 17, 2010, http://www.thermaltechnologyinc.com/index.php?option=com_content&view=article&id=84, pp. 1-3.

Spark Plasma Sintering, http://en.wikipedia.org/wiki/Spark_plasma_sintering, Feb. 17, 2010, p. 1 of 1.

Shen et al., "Spark Plasma Sintering Assisted Diamond Formation from Carbon Nanotubes at Very Low Pressure", Institute of Physics Publishing, Nanotechnology 17 (2006) pp. 2187-2191.

* cited by examiner

BACKFILLED POLYCRYSTALLINE DIAMOND CUTTER WITH HIGH THERMAL CONDUCTIVITY

PRIORITY CLAIM

This application claims priority from U.S. Provisional Application for Pat. No. 61/164,155 filed Mar. 27, 2009, the disclosure of which is hereby incorporated by reference.

TECHNICAL FIELD

The present invention relates generally to polycrystalline diamond cutters.

BACKGROUND

Polycrystalline diamond cutters, also known as Polycrystalline Diamond Compacts (PDCs), are made from synthetic diamond or natural diamond crystals mounted on a substrate made of tungsten carbide. The sintering process used to manufacture these devices typically begins with premium saw-grade diamond crystals. The diamond crystals are sintered together at temperatures of approximately 1400° C. and pressures of around 61 kbar in the presence of a liquid metal synthesizing catalyst, most commonly cobalt, functioning as a binder. Other catalysts can be used including elements from the Group VIII metals (as well as alloys of Group VIII metals), silicon, and other alloys such as magnesium carbonate. The temperature of 1400° C. is typically maintained for approximately 5 to 10 minutes. The system is then cooled and finally depressurized. The pressure rate, the heating rate and the cooling rate depend on the type of equipment (belt or cubic press) used, the particular catalyst used and the raw-grade diamond crystals used. Typically, the diamond is bonded to the tungsten carbide substrate during the same high-temperature, high-pressure process.

It is commonly recognized that PDC cutters wear according to three different modes characterized by the temperature at the cutter tip (see, Ortega and Glowka, "Studies of the Frictional Heating of Polycrystalline Diamond Compact Drag Tools During Rock Cutting," June 1982; and Ortega and Glowka, "Frictional Heating and Convective Cooling of Polycrystalline Diamond Drag Tools During Rock Cutting," Soc. of Petr. Eng. Journal, April 1984; the disclosures of which are hereby incorporated by reference). Below 750° C., the primary mode of wear is micro-chipping of the sintered diamond. Above 750° C., the wear mode changes from micro-chipping of individual diamond grains to a more severe form of wear. This more severe form of wear is caused by 1) stresses resulting from differential thermal expansion between the diamond and the residual metal inclusions along the diamond grain boundaries, and 2) a chemical reaction of the diamond to the cobalt turning the diamond back to graphite as it approaches 800° C.

The prior art teaches a way to extend cutter life by removing the cobalt catalyst from the PDC diamond table to a depth of less than 100 μm, or perhaps between 100 to 200 μm or more, using an acid attack. The acid leaches out substantially all of the interstitial cobalt from the face of the diamond layer to the desired depth leaving interstitial openings. This treatment suppresses the potential for differential thermal expansion between the diamond and the catalyst metal and increases the thermal diffusivity at least in the area of the leached depth from a front face of the diamond table. These products are known to those skilled in the art as leached PDCs and they have an industry recognized performance improvement over non-leached PDCs. The acids required by the leaching process can be harsh and difficult to handle safely.

Leached PDC cutters have been considered to have improved performance over non-leached cutters because of several reasons:

First: The absence of interstitial cobalt in a thermal channel situated along the front face of the diamond table improves heat transfer to drilling fluid, across the diamond table face and to the interior of the cutter through presence of diamond to diamond bonding. Heat transfer along the thermal channel helps to keep the temperature at the cutter tip below a critical temperature past which failure due to diamond chipping occurs. This is due at least in part to the absence of a substantial differential thermal conductivity characteristic (note: a 2000 $Wm^{-1}K^{-1}$ thermal conductivity for the diamond in comparison to a 60 $Wm^{-1}K^{-1}$ thermal conductivity for cobalt). Additionally, while the cobalt has been removed and replaced by a void in the interstices of the leached cutter, the void (which also has poor heat dissipation characteristics) nonetheless appears to create less interference with respect to dissipation of heat across the diamond to diamond bonds than is experienced when interstitial cobalt is present. This explains to some degree why leached cutters perform better than non-leached cutters.

Second: The region where the cobalt has been removed does not appear to suffer bond breakage due to cobalt thermal expansion. This is due at least in part to the absence of a substantial differential thermal expansion characteristic (note: a 13 $\mu mm^{-1}K^{-1}$ thermal expansion coefficient for cobalt in comparison to a 1 $\mu mm^{-1}K^{-1}$ thermal expansion coefficient for diamond). This second point has, according to conventional wisdom, been the key reason for the success of leached PDC cutters.

Third, the heat capacity of the thermal channel situated along the front face of the diamond table decreases which results in a substantial improvement in thermal diffusivity.

Notwithstanding the foregoing and the advantage of leached cutter technology, there exists a need in the art for improvement by providing a leached PDC cutter possessing better thermal properties.

Reference is made to the following prior art documents: U.S. Pat. Nos. 4,016,736; 4,124,401; 4,184,079; 4,605,343; 4,940,180; 5,078,551; 5,609,926; 5,769,986; 5,857,889; 6,779,951; 6,887,144 and 7,635,035; Published PCT Application WO 01/79583; Wang, "A Study on the Oxidation Resistance of Sintered Polycrystalline Diamond with Dopants," Science and Technology of New Diamond, pp 437-439, 1990; Salvadori, "Metal Ion Mixing in Diamond," Surface and Coatings Technology, June 2000, p. 375; Pu, "The Application of Ion Beam Implantation for Synthetic Diamond Surface Modification," IEEE Int. Conf. on Plasma Science, 1197; Weishart, "N-type Conductivity in High-fluence Si-implanted Diamond," Journal of Applied Physics, vol. 97, issue 10, 2005; Vankar, "Ion Irradiation Effects in Diamond and Diamond Like Carbon Thin Films," 1995; Dearnaley, "The Modification of Material by Ion Implantation," Physics in Technology 14, 1983; Stock, "Characterization and Mechanical Properties of Ion-implanted Diamond Surfaces," Surface and Coatings Technology, vols. 146-147, 2001; "Modification of Diamond Single Crystals by Chromium Ion Implantation with Sacrificial Layers," Analytical and Bioanalytical Chemistry, vol. 374, nos. 7-8, 2002; the disclosures of which are hereby incorporated by reference.

SUMMARY

The inventors believe that the primary failing of currently available PDC cutters is not due to the incongruous thermal expansion property of cobalt in comparison to diamond, but rather is due to the fact that a PDC cutter, even with a leached diamond table, exhibits poor thermal conductivity of heat away from the diamond tip on the working face. A cutter constructed or treated to significantly improve thermal conductivity, especially along the front working face of the diamond table (along a thermal channel), in accordance with the present invention will outperform not only conventional PDC cutters, but leached PDC cutters as well. The improved thermal conductivity reduces the risk of 1) stresses resulting from differential thermal expansion between the diamond and the residual metal inclusions along the diamond grain boundaries, and 2) a chemical reaction of the diamond to the cobalt turning the diamond back to graphite.

In accordance with an embodiment, a method is presented for the creation of a thermally stable diamond table for use in a PDC cutter. The method involves increasing the thermal conductivity of the diamond table by backfilling a PDC cutter, where the synthesizing catalyst material (such as, cobalt) has been removed to a desired depth, with a less thermally expandable and/or more thermally conductive and/or lower heat capacity material. In other words, the provided less thermally expandable and/or more thermally conductive and/or lower heat capacity material fills the interstitial voids left by the removed catalyst material in the diamond table to the desired depth along the front face. The desired depth referenced above may, for example, be between 0.010 mm to 1.0 mm.

A material candidate for use in this application is cubic boron nitride, which has a thermal conductivity greater than 200 $Wm^{-1}K^{-1}$ (see, Nature volume 337, Jan. 26, 1989) and thermal expansion coefficient of 1.2 $\mu mm^{-1}K^{-1}$. These values are advantageously comparable to and compatible with the thermal properties of diamond, and further are better than could be achieved in accordance with prior art leached cutter implementations.

Other elemental material candidates for use in this application include: carbon, germanium, zinc, aluminum, silicon, molybdenum, boron, phosphorous, copper, silver, and gold. Combinations of these elements with other elements as well as alloys including one or more of these elements may be used. Again, the thermal properties of these material candidates are superior to interstitial catalyst or interstitial voids as would be present in leached cutters.

The material may alternatively comprise: alkali earth carbonates, sulfates, hydroxides, tungsten oxide, boron carbide, titanium carbide, iron oxides, double oxides, intermetallics and ceramics.

The material chosen for use in the method can be micronized or prepared in other suitable ways to be applied to a front surface of a target diamond table. A treatment is then performed which causes that chosen material to migrate into the diamond table at least partially filling the interstitial voids left by removal of the interstitial cobalt catalyst. In connection with the process, some remaining interstitial synthesizing catalyst material (such as, cobalt) may be at least partially displaced. In any event, the presence of the material in the diamond table along a front face forms a thermal channel having improved thermal properties (such as conductivity or expansion or heat capacity) in comparison to prior art leached and non-leached implementations. This thermal channel provides for better conduction of heat away from the cutter tip and reduces the likelihood of diamond material failure in the diamond table during cutter operation.

In one implementation, the treatment used to effectuate the introduction of the material to the diamond table comprises an imbibition treatment.

In another implementation, the treatment used to effectuate the introduction of the material to the diamond table comprises a Hot Isostatic Pressing (HIPing) treatment.

In another implementation, the treatment used to effectuate the introduction of the material to the diamond table comprises a cold pressing or cryogenic treatment or both in combination.

In another implementation, the treatment used to effectuate the introduction of the material to the diamond table comprises spark plasma sintering.

A number of techniques may be used for applying the material to the front surface of a target diamond table including: painting, coating, soaking, dipping, plasma vapor deposition, chemical vapor deposition, and plasma enhanced chemical vapor deposition. Other techniques are known to those skilled in the art. It will be recognized that some techniques used for applying the material to the front face of the diamond table may additionally and concurrently assist in effectuating migration of the material into the diamond table. For example, deposition techniques as described above, perhaps in conjunction with plasma treatments and selective heating, could produce migration into the diamond table to at least partially fill the interstitial voids left by the removed synthesizing catalyst material (such as, cobalt) in the near surface region of the diamond table.

The material may alternatively be applied and inserted using an ion implantation process at a suitable energy level. In this process, a selected dopant species (for example, boron) is implanted in the front surface of the target diamond table to a certain depth. A subsequent, and perhaps optional, annealing process may be used to diffuse the implanted dopant species to an increased surface depth and/or to cure defects in the diamond crystal structure resulting from the implantation process.

It will further be understood that other mechanical or chemical transfer means and processes could alternatively be used for the purpose of infusing or migrating the less thermally expandable and/or highly thermally conductive material to backfill the leached diamond table to the desired depth.

It will also be understood that the processes and techniques described herein are applicable not only to a cutter with a diamond table mounted to a substrate, but also to free-standing diamond table bodies (which may subsequently be mounted to a substrate such as tungsten carbide).

DETAILED DESCRIPTION OF THE DRAWINGS

Figure 1:
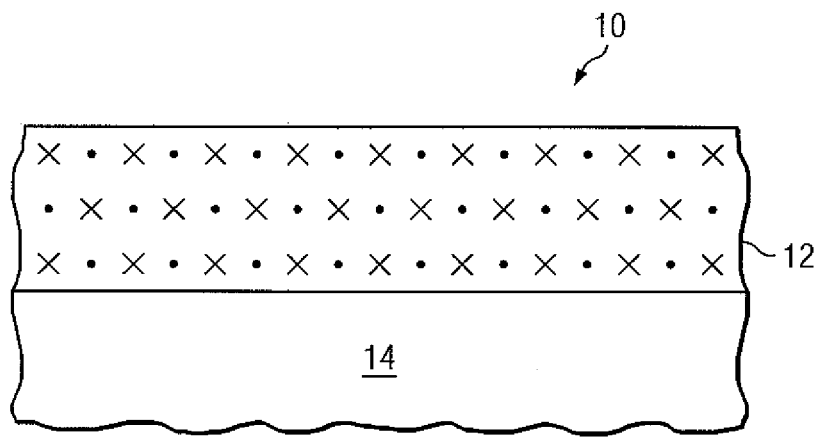
FIG. 1 illustrates a PDC cutter of conventional configuration.

Reference is made to FIG. 1 which illustrates a PDC cutter 10 of conventional configuration. It will be noted that FIG. 1 is not drawn to any particular scale. The cutter includes a diamond table 12 mounted to a substrate 14. The diamond table 12 is formed of diamond crystals (designated by "x") sintered together at high pressure and temperature in the presence of a liquid metal catalyst (designated by "•"), most commonly cobalt (1495° C. melting point). The "x" and "•" representations are illustrative in nature, and are not presented to illustrate the actual crystallographic structure of the diamond table, but rather to show the distributed presence of the diamond crystals "x" and interstitial cobalt binder "•" throughout the diamond table 12 (cobalt content can vary from 3 to 12%). The substrate 14 is typically formed of tungsten carbide. It will be recognized that the inclusion of the substrate 14 is optional (i.e., the diamond table could be a free standing body if desired).

When the PDC cutter 10 is used in a cutting application, it experiences significant heat exposure. Most commonly, heat is generated at an edge of the diamond table (on the working face) where cutting is being performed. The heat arising from cutting action radiates through the diamond table 12 and perhaps to the substrate 14. At elevated temperatures, the diamond table 12 begins to fail due to chipping and other destructive effects relating to the adverse affect heat has on the configuration of the diamond table.

Figure 2:
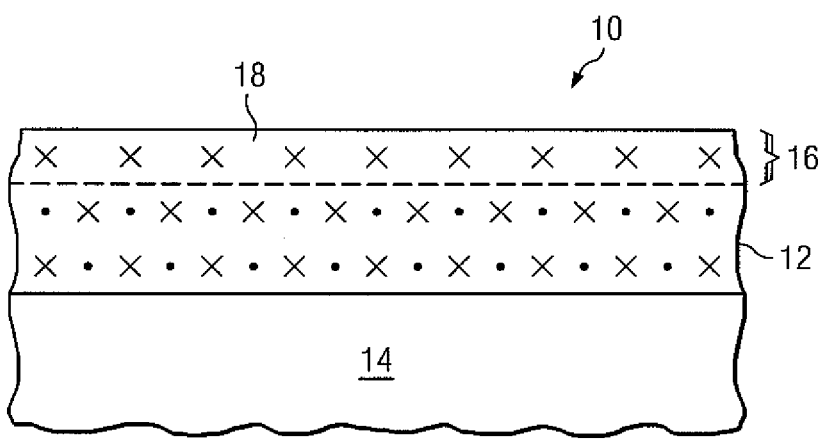
FIG. 2 illustrates a leached PDC cutter of conventional configuration.

To address this issue, the prior art teaches removing the interstitial cobalt from the PDC diamond table to a depth of less than 100 μm, or perhaps between 100 to 200 μm or more, using an acid attack. The acid attack leaches out substantially all of the interstitial cobalt from the face of the diamond layer to the desired depth. A leached PDC cutter 10 of conventional configuration is illustrated in FIG. 2. Again, it will be noted that FIG. 2 is not drawn to any particular scale. One should be recognize, however, the absence of interstitial metal catalyst (designated by "•") near the top surface of the diamond table 12 (working face) as a result of the leaching operation. The leach depth 16 defines a thermal channel 18 which does not suffer as severely from the known differences in thermal properties between diamond and cobalt, and thus has been shown to provide superior performance in comparison to the conventional PDC cutter shown in FIG. 1.

The present invention provides a PDC cutter having a thermal channel with thermal properties superior to those of the leached PDC cutter of FIG. 2. The present invention further provides a method for manufacturing such a PDC cutter with an improved thermal channel. The improved thermal conductivity reduces the risk of 1) stresses resulting from differential thermal expansion between the diamond and the residual metal inclusions along the diamond grain boundaries, and/or 2) a chemical reaction of the diamond to the cobalt turning the diamond back to graphite.

Figure 3:
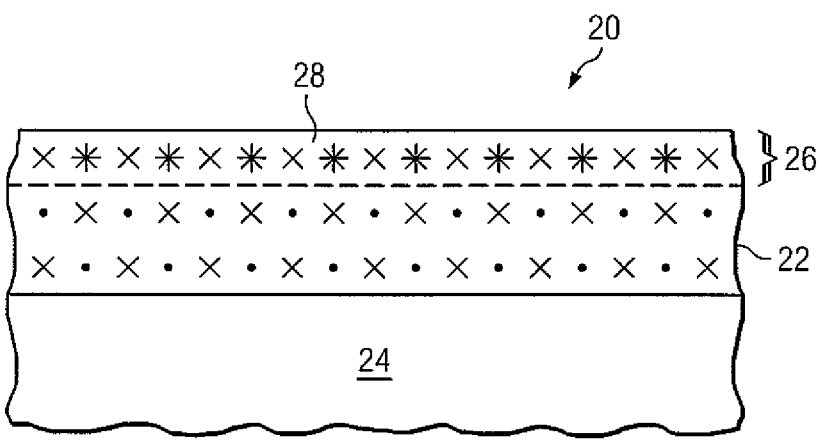
FIG. 3 illustrates a PDC cutter having improved thermal properties in comparison with the cutters of FIGS. 1 and 2.

With reference to FIG. 3, a PDC cutter 20 in accordance with the present invention includes a diamond table 22 mounted to a substrate 24. The diamond table 22 is formed of diamond crystals (designated by "x") sintered together at high pressure and temperature in the presence of a liquid metal catalyst (designated by "•"), most commonly cobalt. The "x" and "•" representations are illustrative in nature, and are not presented to illustrate the actual crystallographic structure of the diamond table, but rather to show the distributed presence of the diamond crystals "x" and interstitial cobalt "•" binder within the diamond table. The substrate 24 is typically formed of tungsten carbide, and is optional (i.e., the diamond table could be a free standing body if desired).

The PDC cutter 20 further includes, associated with its working face, a thermal channel 28 in which a less thermally expandable and/or more thermally conductive and/or lower heat capacity material (designated by "*", and referred to herein as the "material") is present. The starting point is a leached PDC cutter as shown in FIG. 2, and the material (designated by "*") is introduced, for example through overlay, infusion, migration, and/or implantation, into the front face to backfill the interstitial voids left by the removal of the synthesizing cobalt catalyst material to a desired depth 26. The "x", "•" and "*" representations are illustrative in nature, and are not presented to illustrate the actual crystallographic structure of the diamond table, but rather to show the distributed presence of the material "*" in the thermal channel 28 with respect to the diamond crystals "x" and interstitial cobalt "•" binder of the diamond table 22. The thermal channel 28 is defined by the depth 26 to which the material extends from the front (working) face or top surface of the diamond table. The presence of the material to the depth 26 presents a thermal channel 28 whose thermal properties are superior to the FIG. 2 channel 18 provided solely by leaching the interstitial cobalt out of the diamond table. The improved thermal conductivity in the channel 28 reduces the risk of 1) stresses resulting from differential thermal expansion between the diamond and the residual metal inclusions along the diamond grain boundaries, and/or 2) a chemical reaction of the diamond to the cobalt turning the diamond back to graphite.

The material in this application, for example, replaces the cobalt binder leached from the diamond table to the depth 26. The depth 26 may, for example, range from 0.010 mm to 1.0 mm.

As a result, the thermal diffusivity (the ratio of thermal conductivity to volumetric heat capacity) of the thermal channel 28 is increased. This can be accomplished by increasing the numerator of the ratio (for example, through the presence of a material with higher thermal conductivity) or decreasing the denominator of the ratio (for example, through the presence of a material with lower specific heat capacity), or a combination of both of increasing the numerator and decreasing the denominator. It is noted that leaching out the cobalt binder causes thermal conductivity to increase by about 2% while heat capacity drops by about 63% producing an overall increase in diffusivity of about 43%. This explains, to some degree, the advantage of a leached diamond table (see, FIG. 2). Backfilling of the leached cutter with the material, as discussed above, is designed to provide for still further improvement (increase) in diffusivity where the chosen material contributes to effectively increasing the numerator and/or decreasing the denominator of the thermal diffusivity ratio with respect to the thermal channel 28.

Figure 4:
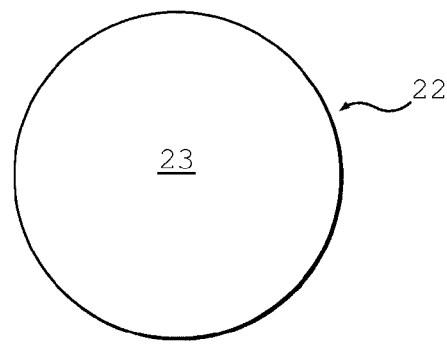
FIGS. 4 and 5 illustrate patterns for application of improved thermal property materials to the face of the cutter.
Figure 5:
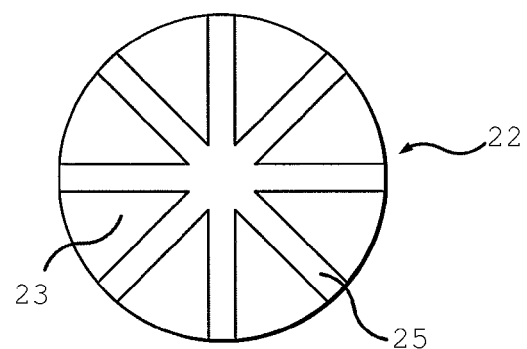

The material may be provided over the entire top surface (front face) 23 of the diamond table 22 (see, FIG. 4), or be provided in accordance with a desired pattern on the top surface (front face) of the diamond table 22 (see, FIG. 5). The pattern selected for material inclusion may assist in more efficiently channeling heat from a cutting tip across the working face of the diamond table. This pattern may be provided and defined by the use of conventional masking techniques. In one exemplary implementation, the material is provided with a pattern 25 as shown in the FIG. 5 comprising a plurality of radially extending regions which include the material backfilled to the desired depth.

A material candidate for use in this application is cubic boron nitride (approximately 3000° C. melting point), which has a thermal conductivity greater than 200 W m$^{-1}$ K$^{-1}$ (see, Nature volume 337, Jan. 26, 1989) and thermal expansion coefficient of 1.2 μm$^{-1}$ K$^{-1}$. These thermal properties are comparable to and compatible with the thermal properties of diamond, and are an improvement over the thermal properties of interstitial voids (as would be pertinent in the cobalt leached cutter of FIG. 2). Improved thermal and mechanical performance of the thermal channel 28 would be experienced from use of the cubic boron nitride as a coating or overlay material supporting the infusion, migration and/or introduction of the component material boron into the diamond table to backfill the interstitial voids left by the leached out synthesizing catalyst material (such as, cobalt) to a desired depth.

Other elemental material candidates for use in this application include: carbon (3500° C. melting point), germanium, zinc, aluminum, silicon, molybdenum (2617° C. melting point), boron (2300° C. melting point), phosphorous, copper, silver, and gold. Combinations of these elements with other elements as well as alloys including one or more of these elements may be used as the material. Again, these materials each possess thermal properties comparable to and compatible with the thermal properties of diamond, and if interstitially included within the diamond table would present an improvement over the thermal properties of interstitial voids (as would be pertinent in the cobalt leached cutter of FIG. 2).

Another material candidate for use in this application alternatively comprises one or more alkali earth carbonates such as $Li_2CO_3$, $NaCO_3$, $MgCO_3$, $SrCO_3$, $K_2CO_3$, and the like.

Another material candidate for use in this application alternatively comprises one or more sulfate such as $Na_2SO_4$, $MgSO_4$, $CaSO_4$, and the like.

Another material candidate for use in this application alternatively comprises one or more hydroxide such as $Mg(OH)_2$, $Ca(OH)_2$, and the like.

Another material candidate for use in this application alternatively comprises tungsten oxide ($WO_3$).

Another material candidate for use in this application alternatively comprises boron carbide ($B_4C$) (2760° C. melting point).

Another material candidate for use in this application alternatively comprises $TiC_{0.6}$ (3160° C. melting point).

Another material candidate for use in this application alternatively comprises one or more iron oxide or double oxide with an approximate melting point of 1566° C. such as $FeTiO_3$, $Fe_2SiO_4$, $Y_3Fe_5O_{12}$, $Fe_5O_{12}$, and the like.

Another material candidate for use in this application alternatively comprises one or more intermetallic materials.

Another material candidate for use in this application alternatively comprises one or more ceramic materials.

A number of different methods may be used to manufacture the PDC cutter 20.

Figure 6:
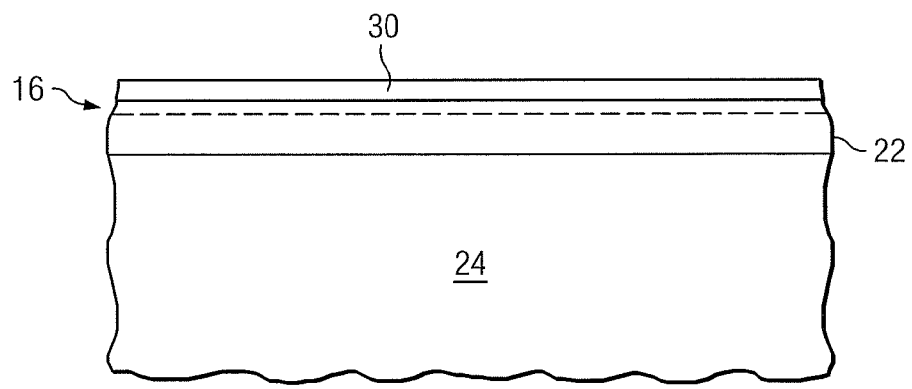
FIG. 6 illustrates application of a coating material to a cutter in accordance with a method of manufacture.

In a first method, a coating of the material 30 (also referred to as the "thermal channel material") is applied to the front surface of the diamond table 22 which has been leached of catalyst binder material to a depth 16 (as indicated by the dashed line). This is shown in FIG. 6. A number of techniques may be used for applying the material to the front surface of a target diamond table including: painting, coating, soaking, dipping, plasma vapor deposition, chemical vapor deposition, and plasma enhanced chemical vapor deposition.

Figure 7:
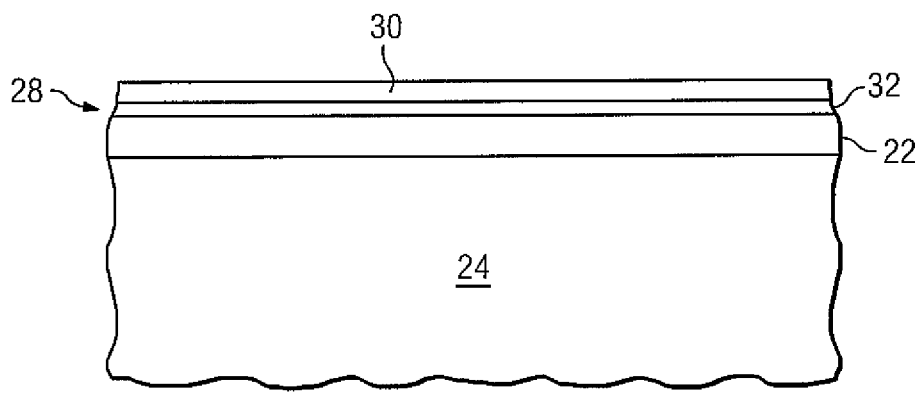
FIG. 7 illustrates performance of a treatment step in the method.

A treatment is then performed which causes that material 30 (or specific components within that material) to backfill voids left by leaching out the synthesizing catalyst material (such as, cobalt) in a near surface region 32 of the diamond table forming the thermal channel 28. This is shown in FIG. 7. The unreacted material 30 may be removed, if desired.

In one implementation, the treatment used comprises an imbibition treatment. Imbibition treatment processes are disclosed in Published U.S. Applications for Patent 2008/0240879 and 2009/0032169, the disclosures of which are hereby incorporated by reference. These imbibition processes are disclosed in connection with effectuating cobalt migration in tungsten carbide substrates, but are believed to be pertinent as well to effectuating an introduction or migration of the material (or components of the material) from the front surface of the diamond table to a desired depth. In connection therewith, the introduced material (or components within that material) backfills the interstitial voids left by the leached out synthesizing catalyst material (such as, cobalt) in the near surface region 32 of the diamond table.

In another implementation, the treatment used comprises a Hot Isostatic Pressing (HIPing) treatment. The operation and characteristics of the HIPing treatment are well understood by those skilled in the art. This process subjects a component to both elevated temperature and isostatic gas pressure in a high pressure containment vessel. The elevated temperature and isostatic gas pressure are believed useful to effectuating the introduction of the material (or components of the material) in the front face of the diamond table. In a preferred embodiment using this method the tungsten carbide substrate and a portion of the diamond layer closest to the tungsten carbide substrate may be encased or masked to preclude treatment of these areas, reserving the treatment to the working face of the diamond layer. In the case of cobalt catalyst binder and the cubic boron nitride material, while submitted to temperature above 750° C., the cobalt expands at a rate that allows the cubic boron nitride material (or the elemental boron component thereof) to diffuse and to fill the interstitial pores under the effect of the isostatic pressure.

Figure 8:
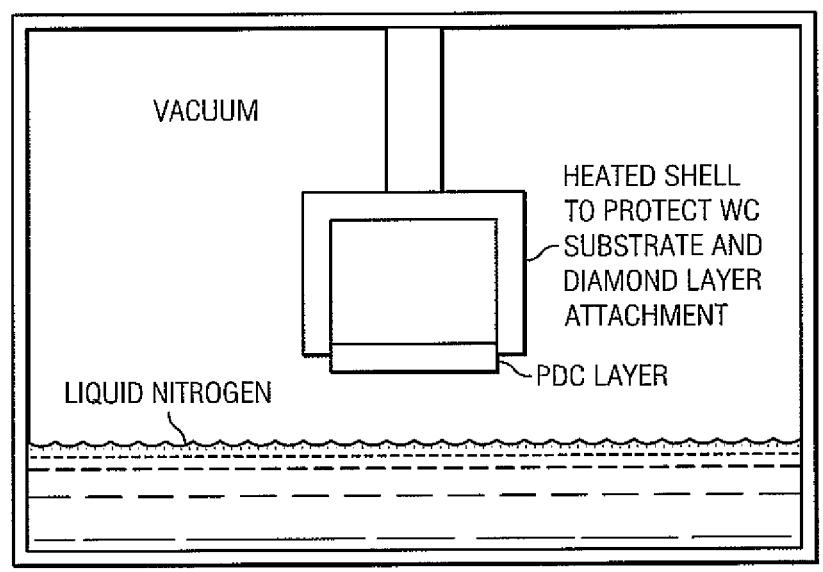
FIG. 8 illustrates a cryogenic treatment mechanism and process.

In another implementation, the treatment used comprises a cold pressing or cryogenic treatment. FIG. 8 illustrates an implementation of this treatment in which the material coated front surface of the diamond table is held in a liquid nitrogen chamber for a selected period of time and vacuum environment. A heated shell is used to hold the tungsten carbide substrate and provide some protection against damage to the tungsten carbide substrate and/or the diamond table bond due to the extreme cold of the liquid nitrogen chamber. The cold temperature and vacuum pressure are believed to facilitate the introduction of the material (or specific components within that material) in the front face of the diamond table. In a preferred embodiment of this method micronized particles of the material (or specific components within that material) can be pressed into the face of the diamond layer with a piston mechanism to further effect the entrance of the material (or components of the material) into the diamond layer.

In another implementation, the treatment used comprises spark plasma sintering, or field assisted sintering or pulsed electric current sintering. Details concerning these processes are known to those skilled in the art (see, for example, Shen, "Spark Plasma Sintering Assisted Diamond Formation From Carbon Nanotubes At Very Low Pressure," 2006 Nanotechnology 17 pages 2187-2191 (2206), the disclosure of which is incorporated by reference). The application of the pulsed current of the sintering technique causes localized heating at high rates with the heat facilitating migration of the material (or components of the material) in and to fill the vacated interstitial pores left by leaching of the face of the diamond table.

In another method, the plasma vapor deposition, chemical vapor deposition, and plasma enhanced chemical vapor deposition used to coat the front surface of the diamond table provides for some penetration of the material into the diamond table for backfilling interstitial voids left by the leached out synthesizing catalyst material (such as, cobalt). The material is heated at a temperature high enough to be vaporized and to be condensed at a temperature below the previous temperature but above 750° C. While submitted to temperature above 750° C., the vapor of the material (of components of the material) diffuses and fills the interstitial pores left by leaching of the face of the diamond table.

In another method, no coating with the material is performed. Instead, the material is selected because it is especially well suited to ion implantation. The selection of boron or phosphorous (or other known p-type or n-type dopants) as likely candidates for ion implantation is preferred as the use of these dopant species is well known from the field of semiconductor integrated circuit fabrication. A PDC cutter as shown in FIG. 2 is placed within an ion implantation chamber and ions of a selected type comprising the material are implanted at high energy for backfilling to replace the leached out synthesizing catalyst material (such as, cobalt). An annealing heat treatment may be performed following implantation to further diffuse the dopant species and/or repair damage to the diamond crystal structure which results from the implantation.

It will further be understood that other mechanical or chemical transfer means and processes could alternatively be used for the purpose of infusing or migrating the material (or components of the material) to backfill for the removed synthesizing catalyst material (such as, cobalt).

It will also be understood that the process, technique and resulting product is applicable not only to a cutter with a diamond table mounted to a substrate, but also to free-standing diamond table bodies (which may subsequently be mounted to a substrate such as tungsten carbide). Thus, the methods described above could be applied just to the diamond table (in the absence of a supporting tungsten carbide substrate).

Embodiments of the invention have been described and illustrated above. The invention is not limited to the disclosed embodiments.

What is claimed is:

1. A PDC cutter, comprising:
   a substrate;
   a diamond table mounted to the substrate, the diamond table comprising diamond crystals and interstitial catalyst binder, the diamond table further having a front face with a thermal channel where the interstitial catalyst binder has been removed and further formed to additionally include in the thermal channel a material, the material being introduced to fill at least some interstitial voids left by removal of the interstitial catalyst binder in the thermal channel to a desired depth, the material being less thermally expandable than the catalyst binder and more thermally conductive than the catalyst binder; and
   wherein the material is selected from a group consisting of: carbon, boron, molybdenum, cubic boron nitride, boron carbide, and titanium carbide ($TiC_{0.6}$).

2. The PDC cutter of claim 1 wherein the material is introduced into the diamond table thermal channel by hot isostatic pressing.

3. The PDC cutter of claim 1 wherein the material is introduced into the diamond table thermal channel by one of spark plasma sintering, field assisted sintering or pulsed electric current sintering.

4. The PDC cutter of claim 1 wherein the desired depth is between 0.010 mm to 1.0 mm.

5. The PDC cutter of claim 1 wherein the interstitial catalyst binder comprises cobalt.

6. The PDC cutter of claim 1 wherein the material is introduced into the thermal Channel by ion implantation.

7. The PDC cutter of claim 1 wherein the material is introduced into the thermal channel by spark plasma sintering.

8. The PDC cutter of claim 1 wherein the material is introduced into the thermal channel by cold pressing.

9. A method of backfilling a PDC cutter, comprising:
   removing from a front face of a diamond table mounted to a substrate, the diamond table comprising diamond crystals and interstitial catalyst binder, the interstitial catalyst binder to form a thermal channel; and
   introducing a material to the front face of the diamond table, the introduced material backfilling the front face of the diamond table to fill interstitial voids left by removal of the catalyst binder in the thermal channel to a desired depth, the material being less thermally expandable than the catalyst binder and more thermally conductive than the catalyst binder; and
   wherein introducing the material comprises introducing the material into the thermal channel by a process selected from a group consisting of ion implantation, spark plasma sintering, and cold pressing.

10. The method of claim 9 where removing comprises leaching the interstitial catalyst binder from the front face of the diamond table.

11. The method of claim 9 wherein the material is cubic boron nitride.

12. The method of claim 9 wherein the material is an elemental material selected from a group consisting of: carbon, molybdenum, and boron.

13. The method of claim 9 wherein the material is one of a combination of two or more of carbon, molybdenum, and boron or an alloy including one or more of carbon, molybdenum, and boron.

14. The method of claim 9 wherein the material is boron carbide.

15. The method of claim 9 wherein the material is $TiC_{0.6}$.

16. The method of claim 9 wherein the material is one of an iron oxide or double oxide.

17. The method of claim 9 wherein material is an intermetallic material.

18. The method of claim 9 wherein the material is a ceramic material.

19. The method of claim 9 wherein the desired depth is between 0.010 mm to 1.0 mm.

20. The method of claim 9 wherein the material is introduced into the thermal channel by ion implantation.

21. The method of claim 9 wherein the material is introduced into the thermal channel by spark plasma sintering.

22. The method of claim 9 wherein the material is introduced into the thermal channel by cold pressing.

23. The method of claim 22 wherein the material comprises micronized particles and introducing the material comprises pressing the micronized particles into the front face of the diamond table.

24. The method of claim 9 wherein the material has a lower heat capacity than the catalyst binder.

25. A method of backfilling a PDC cutter, comprising:
   removing from a front face of a diamond table mounted to a substrate, the diamond table comprising diamond crystals and interstitial catalyst binder, the interstitial catalyst binder to form a thermal channel; and
   introducing a material to the front face of the diamond table, the introduced material backfilling the front face of the diamond table to fill interstitial voids left by removal of the catalyst binder in the thermal channel to a desired depth, the material being less thermally expandable than the catalyst binder and more thermally conductive than the catalyst binder; and
   wherein introducing the material comprises introducing the material into the thermal channel by cryogenic methods or cold pressing or both.

26. The method of claim 25 wherein the material comprises micronized particles and introducing the material comprises pressing the micronized particles into the front face of the diamond table.

27. The method of claim 25 wherein the material has a lower heat capacity than the catalyst binder.

\* \* \* \* \*